United States Patent
Zhao et al.

(10) Patent No.: US 11,109,533 B2
(45) Date of Patent: Sep. 7, 2021

(54) FEEDER HOUSING FOR AGRICULTURAL MACHINE

(71) Applicant: CNH Industrial America LLC, New Holland, PA (US)

(72) Inventors: Kai Zhao, Burr Ridge, IL (US); Michael Minnich, Elizabethtown, PA (US); Jishan Jin, Naperville, IL (US); Wayne T. Flickinger, Oxford, PA (US); Cale N. Boriack, Lititz, PA (US)

(73) Assignee: CNH Industrial America LLC, New Holland, PA (US)

( * ) Notice: Subject to any disclaimer, the term of this patent is extended or adjusted under 35 U.S.C. 154(b) by 119 days.

(21) Appl. No.: 16/525,746

(22) Filed: Jul. 30, 2019

(65) Prior Publication Data
US 2021/0029882 A1 Feb. 4, 2021

(51) Int. Cl.
*A01D 61/00* (2006.01)
*A01D 41/12* (2006.01)
*A01F 12/10* (2006.01)

(52) U.S. Cl.
CPC .......... *A01D 61/002* (2013.01); *A01D 41/12* (2013.01); *A01F 12/10* (2013.01)

(58) Field of Classification Search
CPC ........ A01D 61/002; A01D 41/12; A01F 12/10
See application file for complete search history.

(56) References Cited

U.S. PATENT DOCUMENTS

| | | | |
|---|---|---|---|
| 3,973,380 A | 8/1976 | Knollman et al. | |
| 4,282,703 A * | 8/1981 | Wilson | A01D 61/00 56/14.6 |
| 4,288,969 A | 9/1981 | Underhill | |
| 4,657,029 A * | 4/1987 | Helm | A01F 12/16 460/106 |
| 4,776,153 A | 10/1988 | DePauw et al. | |
| 5,799,483 A * | 9/1998 | Voss | A01D 75/287 460/119 |
| 5,882,257 A | 3/1999 | Cooksey et al. | |
| 6,561,342 B2 * | 5/2003 | Lepage | B65G 33/08 198/550.1 |
| 6,922,983 B2 | 8/2005 | Gryspeerdt | |

(Continued)

FOREIGN PATENT DOCUMENTS

JP 2017175940 A 10/2017

OTHER PUBLICATIONS

Extended European Search Report for EP Application No. 20187525.9 dated Dec. 17, 2020 (10 pages).

*Primary Examiner* — Arpad Fabian-Kovacs
(74) *Attorney, Agent, or Firm* — Peter Zacharias; Patrick Sheldrake

(57) ABSTRACT

A reinforced feeder housing for an agricultural machine includes a housing body having a top surface, a bottom surface, and two opposing side surfaces each extending between the top and bottom surfaces. The housing body includes a front opening through which crop material is directed into the feeder housing from a header of the agricultural machine, and a rear opening that is substantially opposite the front opening through which crop is expelled from the feeder housing and is delivered to a threshing mechanism of the agricultural machine. Various panels of the housing body are reinforced to improve the structural integrity of the feeder housing and prevent damage to the welds in the housing body.

19 Claims, 7 Drawing Sheets

(56) References Cited

U.S. PATENT DOCUMENTS

| | | | |
|---|---|---|---|
| 8,920,226 B2 | 12/2014 | Duquesne et al. | |
| 9,309,057 B2 * | 4/2016 | Juelke | A01D 75/287 |
| 9,468,148 B2 | 10/2016 | Ritter et al. | |
| 2003/0172637 A1 * | 9/2003 | Watts | A01D 41/16 |
| | | | 56/14.7 |
| 2005/0016146 A1 * | 1/2005 | Shidler | A01D 41/127 |
| | | | 56/16.4 R |
| 2012/0317951 A1 * | 12/2012 | Vereecke | A01D 41/16 |
| | | | 56/14.9 |
| 2013/0219846 A1 * | 8/2013 | Verhaeghe | A01D 41/16 |
| | | | 56/16.4 R |
| 2013/0298515 A1 * | 11/2013 | Lohrentz | A01D 41/141 |
| | | | 56/51 |
| 2014/0360149 A1 * | 12/2014 | Lohrentz | A01D 45/021 |
| | | | 56/103 |
| 2016/0057935 A1 * | 3/2016 | Ritter | A01D 41/14 |
| | | | 460/16 |
| 2016/0106021 A1 * | 4/2016 | Lohrentz | A01D 41/14 |
| | | | 56/11.9 |
| 2016/0165796 A1 * | 6/2016 | Carpenedo | A01D 41/16 |
| | | | 56/14.7 |
| 2018/0007832 A1 * | 1/2018 | Matousek | A01D 41/16 |

* cited by examiner

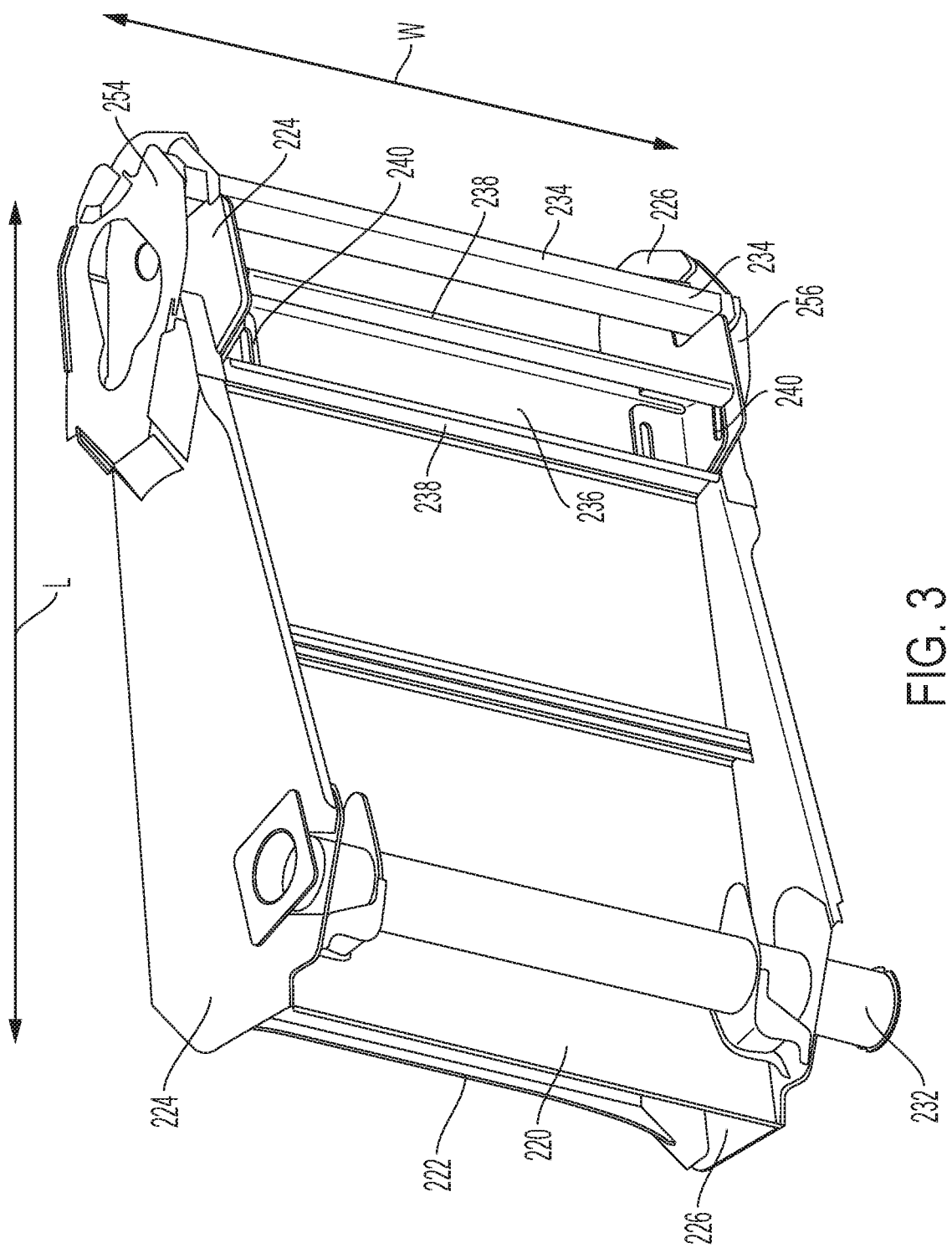

FEEDER HOUSING FOR AGRICULTURAL MACHINE

FIELD OF THE INVENTION

The present invention relates generally to a feeder housing for an agricultural machine, such as a combine harvester.

BACKGROUND OF THE INVENTION

As is described in U.S. Pat. No. 8,920,226 to CNH America LLC, which is incorporated by reference herein in its entirety and for all purposes, a combine harvester has at its front end an intake feeder system that cuts the crop from the ground and feeds it to a threshing mechanism. The intake feeder system comprises a header and a feeder housing (also referred to herein as an elevator) that raises the crop to the level of the mouth of the threshing mechanism. The feeder housing may be a welded assembly of sheet metal plates. Commonly, the header, which takes different forms depending on the type of crop, is wider than the feeder housing and is provided with augers or belts arranged at each side of the header to push the cut crop towards the central feeder housing. The threshing mechanism separates the grain from the stalks, or straw, and the chaff. The grain is stored in a tank on board the harvester while the straw and the chaff are discharged from the rear end of the harvester.

The threshing is carried out by passing the crop between a rotating cylinder and a surrounding concave. The cylinder has threshing elements on its surface that separate the grain by beating and crushing the crop against the surrounding concave, and the concave has openings through which the separated grain can fall to be transferred to the storage tank. Depending on the design of the harvester, the cylinder may be disposed longitudinally or transversely but the present invention is primarily concerned with harvesters having longitudinal threshing cylinders.

As is described in U.S. Pat. No. 5,882,257 to CNH America LLC, which is incorporated by reference herein in its entirety and for all purposes, during the harvest of crops, harvesting machines frequently pick up and ingest rocks and other foreign matter. The rocks and foreign matter ingested by the harvesting machine can damage the crop handling mechanisms of the harvesting machine. As a result, many harvesting machines, such as combines, include devices for detecting and separating the rocks and foreign matter from the crops and forage. The separated rocks and foreign matter collect within a rock trap sump of the feeder housing for later discharge and disposal.

Conventional rock trap sumps include a cavity or chamber formed in the feeder housing for storing the separated rocks and foreign matter and a door for emptying the rocks and foreign matter from the chamber. The door is typically hinged adjacent to a rock trap sump opening and pivots to open and close the opening. During the collection of rocks and foreign matter within the chamber, a door latch independently supported adjacent and below the rock trap sump engages and supports the door in a closed position. To empty the chamber, the door latch is actuated to release the door, thereby permitting the door to fall open for the discharge of rocks and foreign matter.

During operation of the combine harvester, various areas of the welded feeder housing are subject to high stresses which can impact the integrity of the welds of the feeder housing. Described herein is a reinforced feeder housing that can better withstand the high stresses of operation.

SUMMARY OF THE INVENTION

According to one aspect of the invention, a reinforced feeder housing for an agricultural machine includes a housing body having a top surface, a bottom surface, and two opposing side surfaces each extending between the top and bottom surfaces. The housing body includes a front opening through which crop material is directed into the feeder housing from a header of the agricultural machine, and a rear opening that is substantially opposite the front opening through which crop is expelled from the feeder housing and is delivered to a threshing mechanism of the agricultural machine. Various panels of the housing body are reinforced to improve the structural integrity of the feeder housing and prevent damage to the welds in the housing body.

More particularly, according to one example, the feeder housing includes a cross member extending between and either directly or indirectly connecting the opposing side surfaces, a first bracket that is connected to the cross member and one of the side surfaces, and a second bracket that is connected to the cross member and the other of the side surfaces.

According to another example, a leading edge of the top panel that at least partially defines the front opening includes (i) connection ends each of which is connected to one of the side panels, and (ii) a central portion extending between the connection ends, wherein the connection ends are positioned forward of the central portion of the leading edge.

According to yet another example, an opening is defined in the bottom panel at a location adjacent a weld between the bottom panel and one of the side panels.

According to yet another example, a cross member is disposed at a location adjacent the rear opening and extends between and either directly or indirectly connects the opposing side surfaces. The cross member is connected to each side surface in addition to side panels that are each connected to one of the side surfaces.

Also described herein is a combine harvester comprising any one of the above-described feeder housings.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 3 is a bottom side isometric view of the feeder housing (various features have been omitted for clarity).

DETAILED DESCRIPTION OF THE INVENTION

Figure 1:
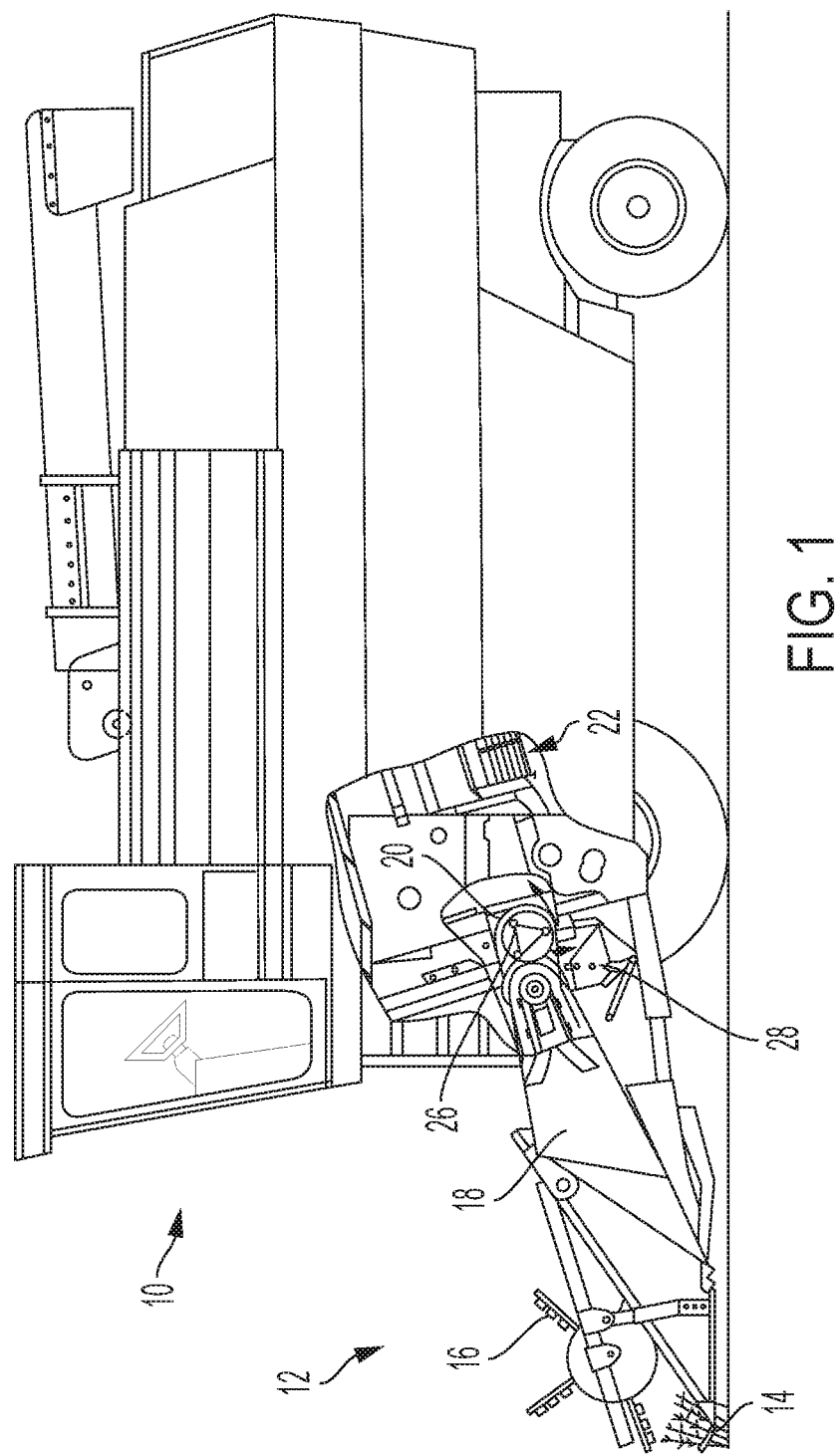
FIG. 1 is a side view of a combine harvester.

Corresponding reference characters indicate corresponding parts throughout the several views. The exemplification set out herein illustrates an embodiment of the invention, in one form, and such exemplification is not to be construed as limiting the scope of the invention in any manner.

The terms "forward", "rearward", "left" and "right", when used in connection with the agricultural combine and/or components thereof are usually determined with reference to the direction of forward operative travel of the combine, but again, they should not be construed as limiting. The terms "longitudinal" and "transverse" are determined with reference to the fore-and-aft direction of the combine and are equally not to be construed as limiting.

In FIG. 1, a combine harvester 10 has an intake feeder system 12 having a header with a cutter 14 and a reel 16, a feeder housing (or elevator) 18 and a stone separator 20 arranged between the top of the feeder housing 18 and the threshing mechanism 22. The stone separator 20 comprises a feed beater 26, in the form of a rotor with projecting paddles, arranged above a rock trap sump 28. The feed beater 26 conveys the crop towards the threshing mechanism 22 while rocks and foreign matter, which are generally heavier and denser than the crop, are impacted and downwardly discharged into the interior of the rock trap sump 28. The rotation of the feed beater 26 propels the rocks and foreign matter downwardly through straw and chaff and into the rock trap sump. As a result, the rocks and foreign matter are separated from the crop prior and prevented from reaching the threshing mechanism 22.

As noted above, during operation of the combine harvester, various areas of the welded feeder housing 18 are subject to high stresses, and the high stresses can impact the integrity of the welds of the feeder housing 18. This effect is most pronounced at locations on the feeder housing 18 where stiff panels are welded to relatively flexible panels. Described hereinafter is a reinforced feeder housing 218 that can better withstand the high stresses of operation.

Figure 2A:
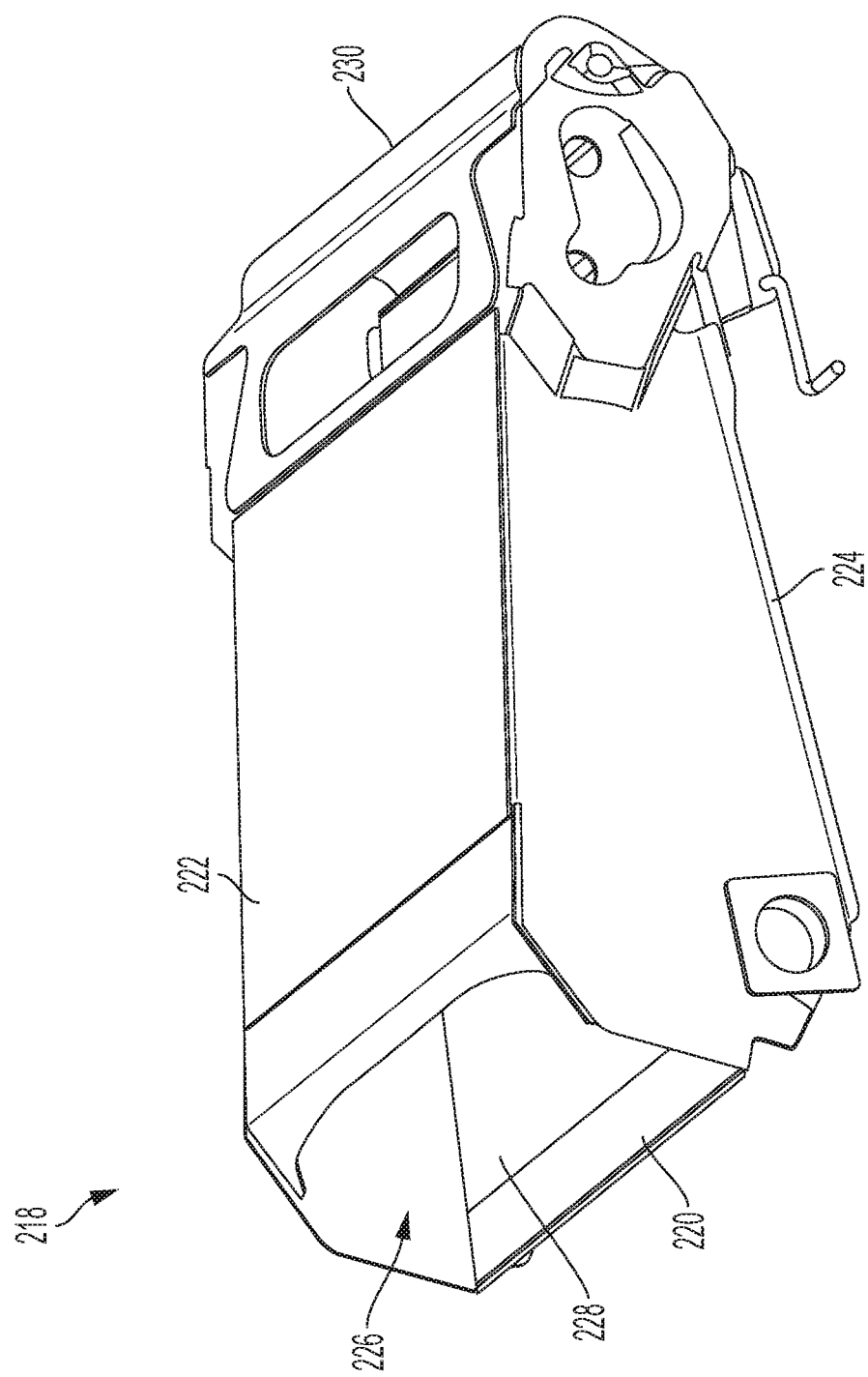
FIGS. 2A and 2B are top side isometric views of a reinforced feeder housing for the combine harvester of FIG. 1.
Figure 2B:
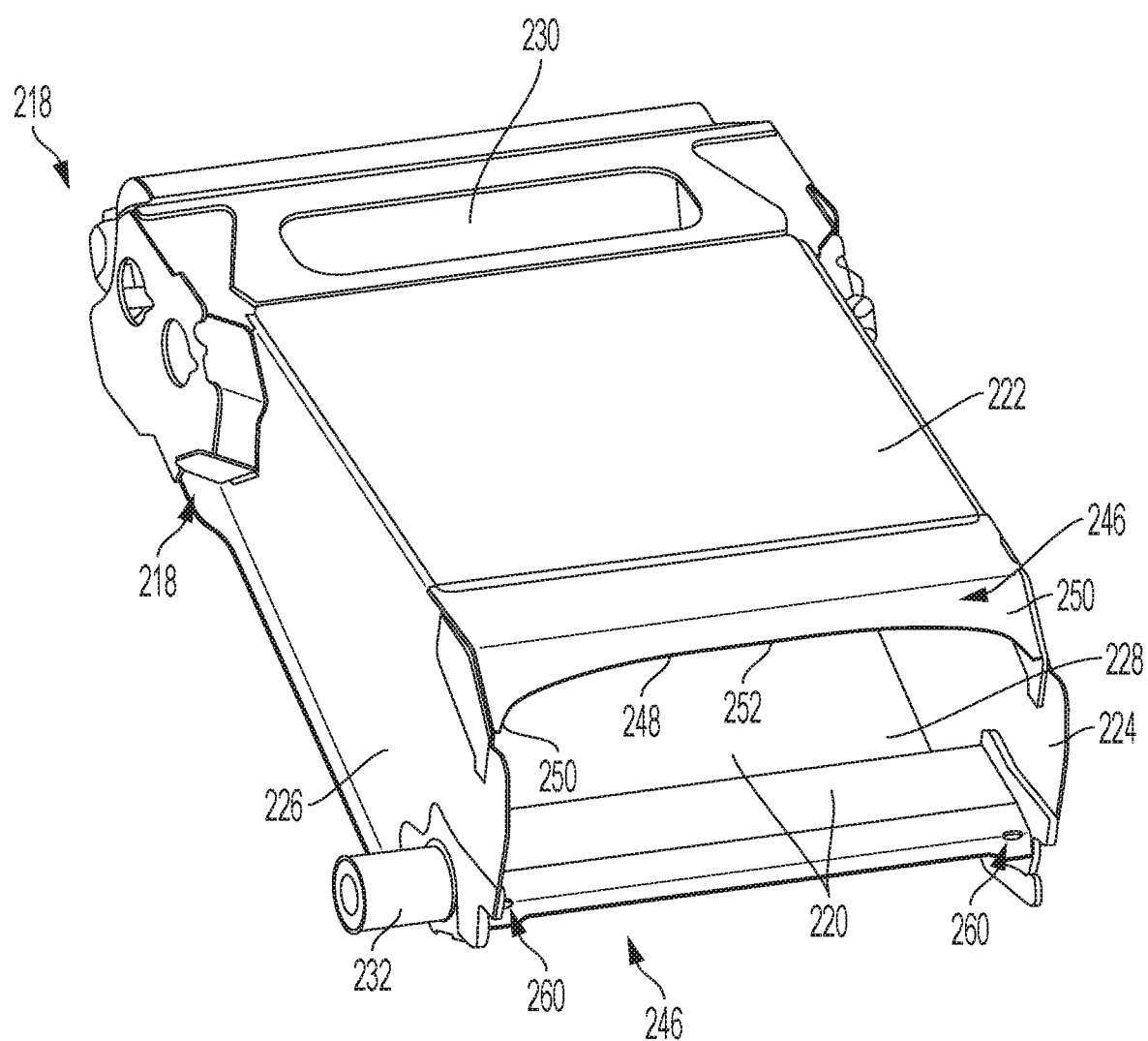

Referring now to FIGS. 2A and 2B, the reinforced feeder housing 218, which may also be referred to herein as housing 218, comprises a plurality of metal plates that are welded together (or otherwise fastened) in a rectangular hollow box shape. More particularly, the housing 218 generally includes a bottom member 220, a top member 222, and two side members 224 and 226. Each member 220, 222, 224 and 226 comprises one or more plates that are fastened either directly or indirectly. The housing 218 further includes a front opening 228 through which crop material is directed into the housing 218 from the reel 16, and a rear opening 230 through which crop is expelled from the housing 218 and is delivered to the threshing mechanism 22. Various automated devices, such as a conveyor, may or may not be positioned within the interior of the housing 218 for conveying the crop from the front opening 228 to the rear opening 230. As best shown in FIG. 3, one or more tubes 232 and a rear beam 234 extend between the side members 224 and 226 for enhancing the structural integrity of the housing 218. A shaft may be positioned within the tube 232.

A rock trap sump 236 is at least partially formed by a cross member 238. The cross member 238 is connected to and extends transversely between the side members 224 and 226. The cross member 238 may also be connected the bottom member 220. The opening formed by the cross member 238 faces downwardly. In operation, the sump 236 collects rocks and stones, as described above. The stiffness of the cross member 238 is greater than the stiffness of the side members 224 and 226 due at least in part to the structurally stable U-shaped geometry of the cross member 238. The cross member 238 may be welded to the bottom member 220 and the side members 224 and 226. The welded joints interconnecting the side members 224 and 226 and the cross member 238 are subject to high stresses for at least the reason that the cross member 238 is structurally stiff whereas the side members 224 and 226 are relatively flexible.

Figure 4:
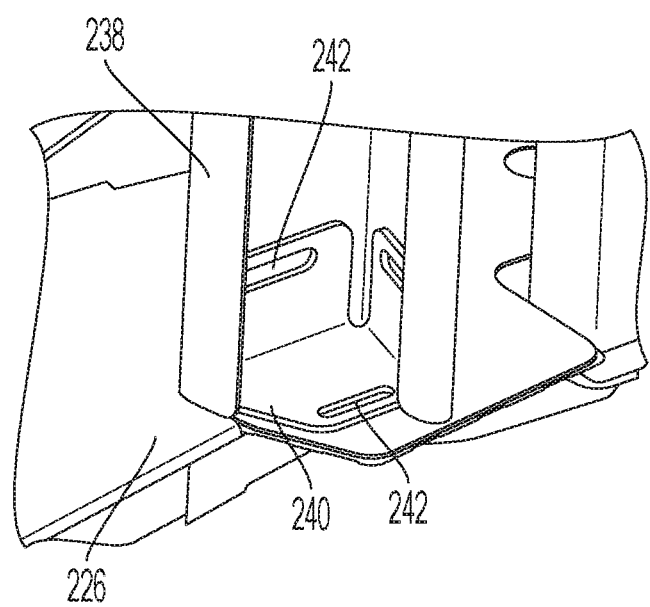
FIG. 4 is a detailed view of the feeder housing as taken from FIG. 3.

As best shown in FIG. 4, reinforcement brackets 240 are provided to compensate for the high stresses at the welds interconnecting the stiff cross-member 238 and each flexible side member 224 and 226. One reinforcement bracket 240 is welded or otherwise attached to (i) at least two interior facing sides of the cross-member 238, and (ii) the interior facing side of the side member 224. Another reinforcement bracket 240 is welded or otherwise attached to (i) at least two interior facing sides of the cross-member 238, and (ii) the interior facing side of the side member 226. The reinforcement bracket 240 is a plate having a first surface for mounting to one of the side members 224 and 226, a second surface for mounting to one interior facing side of the cross member 238, and a third surface for mounting to an orthogonal interior facing side of the cross member 238. The first surface is oriented orthogonal to the second and third surfaces. The second surface is oriented orthogonal to the third surface. The bracket 240 includes a plurality of elongated slots 242 (three slots shown) and round holes that are used as welding interface surfaces. The brackets 240 could also be bolted, or otherwise fastened, to the members 238, 226 and 224 in lieu of welding.

Referring now to FIG. 2B, stress concentrations also exist at the welded interface between the front end 246 of the top member 222 and the side member 224, as well as the welded interface between the front end 246 of the top member 222 and the side member 226. To alleviate the stress concentrations, the front end 246 of the top member 222 has a crescent shaped leading edge 248. The leading edge 248 may take other shapes. More particularly, the connection ends 250 of the leading edge 248 are positioned closer to the front end 246 (and/or the lower member 220) than the central portion 252 of the surface 248. Relieving surface 248 at the central portion 252 maximizes the size of the opening 228 through which crop material is distributed into the housing 218, while maximizing the surface area that is available for connection at the connection ends 250. Each of the connection ends 250 is welded, or otherwise fastened, to one of the side members 224 and 226. Increasing the amount of material at the connection ends 250, as compared with the central portion 252, increases the number of possible welds at the connection ends 250, which increases the integrity of the welded connections at the connection ends 250.

Figure 5:
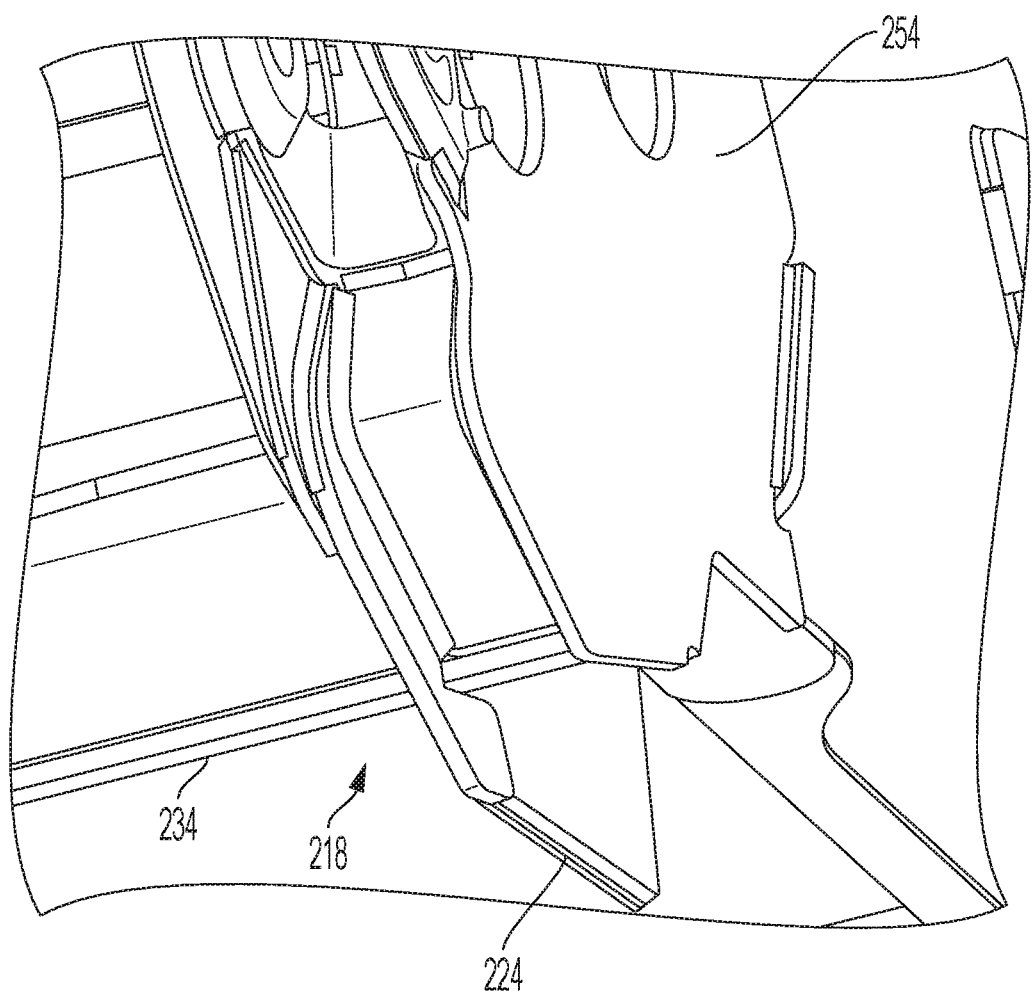
FIG. 5 is a detailed view of the feeder housing.

Turning now to FIGS. 3 and 5, stress concentrations also exist at the welded interface between the rear beam 234 and the side member 224, as well as the welded interface between the rear beam 234 and the side member 226. This is due at least in part because the rear beam 234 has a greater rigidity than the flexible side members 224 and 226 to which it is attached. To alleviate the stress concentrations, the rear beam 234 is welded, or otherwise fastened, to the side members 224 and 226. Additionally, the rear beam 234 is also welded, or otherwise fastened, to additional side plates 254 and 256. Welding the rear beam 234 to each side of the housing 218 at multiple locations along the width 'W' of the housing 218 increases the integrity of those welds, as well as the integrity of the housing 218. The side plate 254 is welded, or otherwise fastened over the side member 224 at multiple locations along the length 'L' of the housing 218. Similarly, the side plate 256 is welded, or otherwise fastened over the side member 226 at multiple locations along the length 'L' of the housing 218. The side plates 254 and 256 are positioned transversely outward from the side members 224 and 226, respectively. A box is formed on one side of the housing 218 between the plate 254 and the side member 224, and another box is formed on one side of the housing 218 between the plate 256 and the side member 226.

Figure 6:
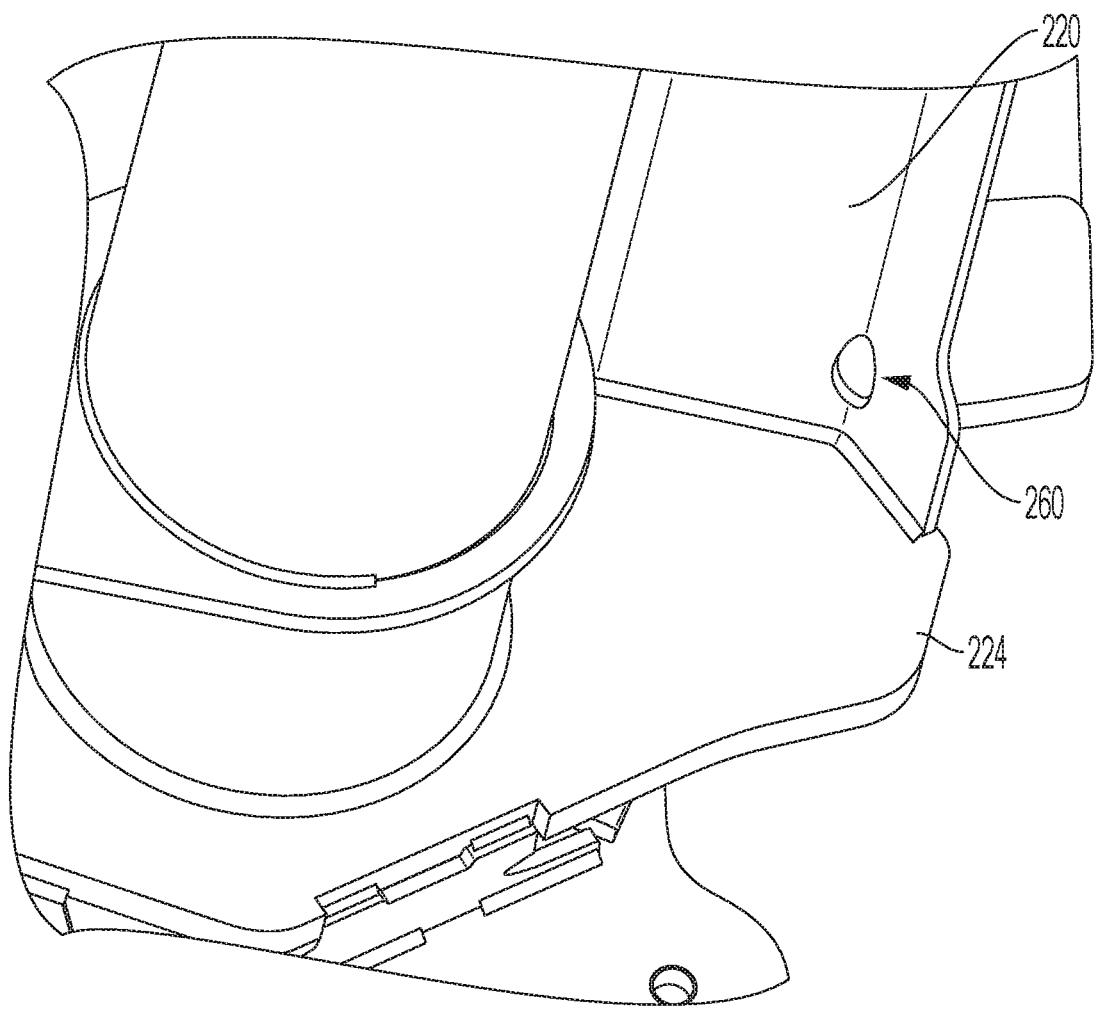
FIG. 6 is a detailed view of the feeder housing.

Turning now to FIGS. 2B and 6, stress concentrations also exist at the welded interface between the front end 246 of the bottom member 220 and the side member 224, as well as the welded interface between the front end of the bottom member 220 and the side member 226. To alleviate the stress concentrations, the front end 246 of the bottom member 220 includes openings 260 that are positioned proximal to or adjacent each of the side members 224 and 226. The openings 260 may be elongated slots, as shown, or the openings 260 may take other shapes. In use, the openings 260 absorb at least a portion of the stress concentrations that typically appear at the welded interface between the front end 246 of the bottom member 220 and the side member 224, as well as the welded interface between the front end of the bottom member 220 and the side member 226.

In light of all the foregoing, it should thus be apparent to those skilled in the art that there has been shown and described a feeder housing for an agricultural machine, such as a combine harvester. However, it should also be apparent that, within the principles and scope of the invention, many changes are possible and contemplated, including in the details, materials, and arrangements of parts which have been described and illustrated to explain the nature of the invention. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

What is claimed is:

1. A feeder housing for an agricultural machine, said feeder housing comprising:
   a housing body comprising a top surface, a bottom surface, two opposing side surfaces each extending between the top and bottom surfaces, a front opening through which crop material is directed into the feeder housing from a header of the agricultural machine, and a rear opening that is substantially opposite the front opening through which crop is expelled from the feeder housing and is delivered to a threshing mechanism of the agricultural machine;
   a cross member extending between and either directly or indirectly connecting the opposing side surfaces;
   a first bracket that is connected to the cross member and one of the side surfaces; and
   a second bracket that is connected to the cross member and the other of the side surfaces,
   wherein each bracket is a unitary member having three different mounting surfaces, a first mounting surface of the three different mounting surfaces being directly mounted to the bottom surface, a second mounting surface of the three different mounting surfaces being directly mounted to an end of the cross member, and a third mounting surface of the three different mounting surfaces being directly mounted to one of the two opposing side surfaces.

2. The feeder housing of claim 1, wherein each bracket is welded to two different surfaces of the cross member.

3. The feeder housing of claim 1, further comprising a second cross-member extending between and either directly or indirectly connecting the opposing side surfaces, wherein the cross members and two opposing side surfaces together delimit at least a portion of a rock trap sump of the feeder housing.

4. The feeder housing of claim 1, wherein each bracket is welded to the cross member at two or more different locations and is also welded to said one of the opposing side surfaces.

5. The feeder housing of claim 1, wherein the three different mounting surfaces extend orthogonally with respect to one another.

6. A combine harvester comprising the feeder housing of claim 1.

7. A feeder housing for an agricultural machine, said feeder housing comprising:
   a housing body comprising a top panel, a bottom panel, two opposing side panels each extending between the top and bottom panels, a front opening through which crop material is directed into the feeder housing from a header of the agricultural machine, and a rear opening that is substantially opposite the front opening through which crop is expelled from the feeder housing and is delivered to a threshing mechanism of the agricultural machine,
   wherein a leading edge of the top panel that at least partially defines the front opening includes (i) connection ends each of which is connected to one of the side panels, and (ii) a central portion extending between the connection ends, wherein the leading edge constitutes a single continuous edge formed on the top panel,
   wherein the connection ends of the leading edge are positioned forward of the central portion of the leading edge.

8. The feeder housing of claim 7, wherein the central portion of the leading edge is positioned closer to the rear opening than the connection ends of the leading edge.

9. The feeder housing of claim 7, wherein the leading edge is crescent shaped.

10. The feeder housing of claim 7 further comprising an opening defined in the bottom panel at a location adjacent a weld between the bottom panel and one of the side panels.

11. The feeder housing of claim 10, wherein the opening is an elongated slot that extends transversely.

12. The feeder housing of claim 10, wherein the opening is disposed adjacent the front opening of the housing body.

13. A combine harvester comprising the feeder housing of claim 7.

14. The feeder housing of claim 1, wherein the cross member is connected to each side surface in addition to side panels that are each connected to one of the side surfaces.

15. The feeder housing of claim 14, wherein one of the side panels is positioned transversely outward from one of the side surfaces, and the other side panel is positioned transversely outward from the other side surface.

16. The feeder housing of claim 15, wherein one of the side panels is welded to said one of the side surfaces, and the other side panel is welded to the other side surface.

17. The feeder housing of claim 14, wherein the cross member is welded to each side surface and each side panel.

18. The feeder housing of claim 14, wherein, on each side of the housing body, the side surface and the side panel that is connected thereto forms at least a portion of a box.

19. A combine harvester comprising the feeder housing of claim 14.

\* \* \* \* \*